United States Patent [19]

Reder

[11] 3,848,892
[45] Nov. 19, 1974

[54] BOAT TRAILER ATTACHMENT
[76] Inventor: Gerard S. Reder, 467 North St., Pittsfield, Mass. 01201
[22] Filed: June 18, 1973
[21] Appl. No.: 371,110

[52] U.S. Cl................................. 280/414 R, 9/1 T
[51] Int. Cl.............................................. B60p 3/10
[58] Field of Search...... 280/414 R; 9/1 T; 214/505, 214/506, 85.5

[56] References Cited
UNITED STATES PATENTS
3,038,617   6/1962   Seegrist.............................. 214/506
3,176,865   4/1965   Faul et al............................. 214/505

Primary Examiner—Trygve M. Blix
Assistant Examiner—Stuart M. Goldstein
Attorney, Agent, or Firm—Breitenfeld & Levine

[57] ABSTRACT

An attachment for use with a boat trailer having an upstanding post and a winch mounted on the post. The attachment includes an extensible arm, which may comprise an outer sleeve and an inner telescoping member, adapted to be coupled to the post. The winch rope can be trained about a pulley carried at the end of the sleeve and then secured to the inner member, so that operation of the winch causes the inner member to move out of the sleeve and push a boat rearwardly with respect to the trailer.

9 Claims, 4 Drawing Figures

PATENTED NOV 19 1974 3,848,892

BOAT TRAILER ATTACHMENT

This invention relates, generally, to attachments for boat trailers, and in particular to a mechanical arrangement for pushing a boat off a trailer.

Boats are generally transported over land on trailers. Since boats are heavy most trailers are equipped with winch systems for pulling boats upwardly from the water in which they float onto the trailers used for transportation. However, known winch systems either do not provide a purely mechanical means for launching the boat from the trailer, or are extremely expensive due to the fact that they are motor driven. This situation compels those having the burden of launching a boat with the choice of exerting their strength to manually push the boat from the trailer into the water or of buying and using one of the expensive motorized winch systems. Furthermore, it has been found that the motorized launch systems do not work effectively.

It is an object of the present invention to provide a simple mechanical trailer attachment for initiating the movement of a boat off a trailer.

It is another object of the present invention to provide a mechanical attachment, for aiding in pushing a boat off a trailer, which can readily be retrofitted on to existing trailers.

It is a further object of the invention to provide an attachment by means of which the usual winch found on a boat trailer can be used to initiate the pushing of a boat off the trailer.

The foregoing and other objects and features of the invention are incorporated in an example of the invention to be described with reference to the accompanying drawings, in which:

FIG. 3 is a partial cross-sectional view of the attachment showing the extension of a pusher arm when a winch rope attached to the arm is taken in.

Figure 1:
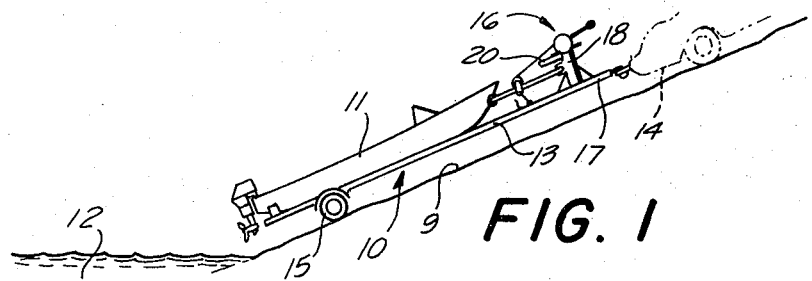
FIG. 1 is an environmental view showing a trailer being backed down a launching ramp, the trailer having an attachment, according to the invention, for pushing the boat from the trailer.

FIG. 1 shows a trailer 10, carrying a boat 11 coupled by a conventional hitch to the back of a car 14. The trailer frame 13 is supported by wheels 15. The car and trailer are shown being backed down a launching ramp 9 toward the water 12. Ordinarily, the backing continues until the wheels 15 and the stern of the boat move well into the water. At that point, the car is braked, and the boat 11 is pushed backward off the trailer 10 into the water.

Figure 2:
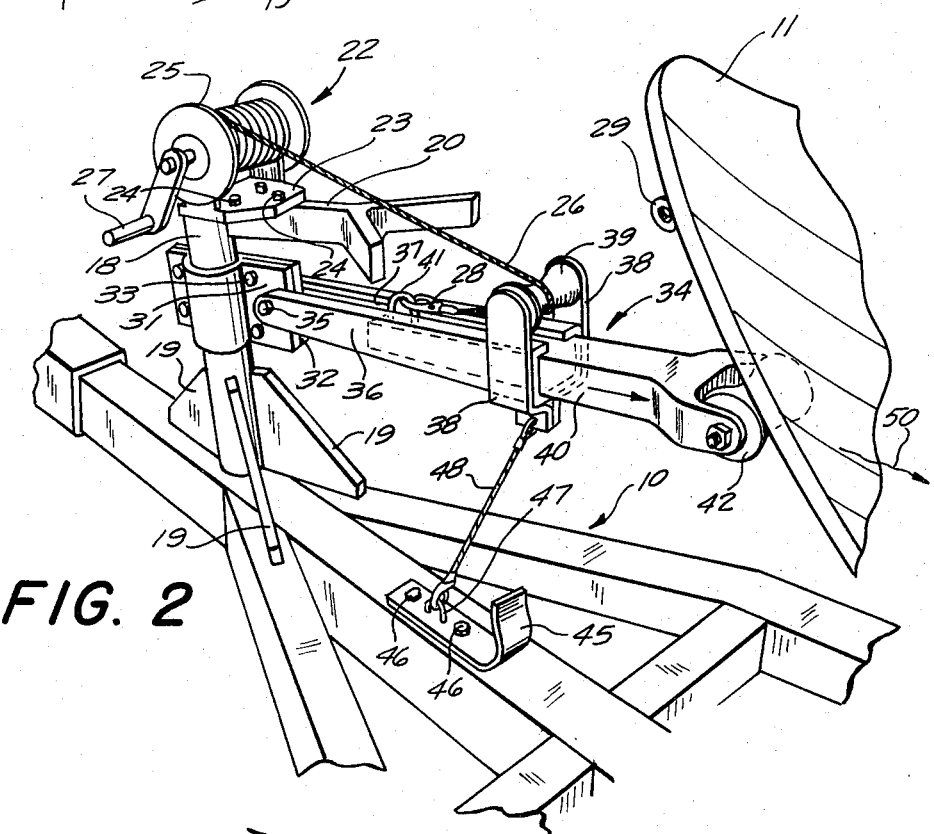
FIG. 2 is a perspective view of the attachment on the trailer.
Figure 3:
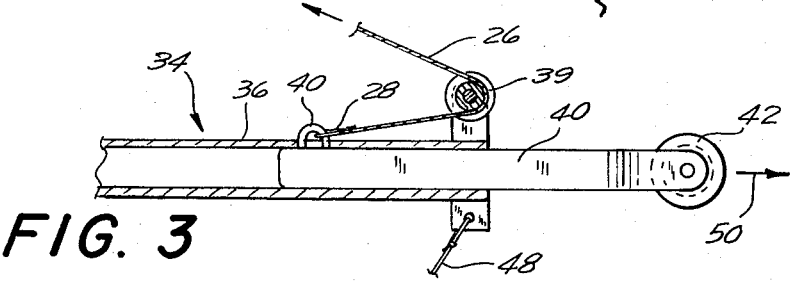

Referring particularly to FIG. 2, an upstanding post 18 is connected directly to the frame 13, and ribs 19 fixed to the frame and to the post provide lateral support to the post. Post 18 includes at its upper end a Y-shaped projection 20 extending towards the rear of the trailer. Projection 20 is provided to serve as an abutment which limits the forward movement of boat 11 on to trailer 10. The upper end of the post 18 and projection 20 support a winch 22. Winch 22 includes a base 23 fixed to the projection 20 and to the upper end of the post by screws 24, a drum 25 rotatably coupled to the base, a rope 26 wound upon the drum, and a handle 27 for rotating the drum to pay out or take in the rope 26. The end of rope 26 carries a hook 28. Hook 28 may be engaged with a loop 29 on the bow of boat 11, or some other suitable fixture on the boat, and winch 22 may be used to take in the rope, thereby loading the boat 11 on the trailer 10.

As thus far described the boat trailer is completely conventional. Ordinarily, the winch 22 is useful only for loading the boat on to the trailer and is of no use when launching the boat from the trailer. The purpose of the present invention is to provide an attachment whereby the winch 22 can be used to help push the boat 11 off trailer 10.

The attachment chosen to illustrate the invention includes a clamp 30 adapted to be secured to the post 18 between the projections 20 and ribs 19. Clamp 30 includes a pair of generally rectangular members 31 and 32, each of the members having a semicylindrical section, and bolts 33 and nuts (not shown) connecting the members 31 and 32 together such that the cylindrical sections frictionally engage the post 18 and rectangular sections of the member extend towards the rear of the trailer 10. By means of clamp 30, an extensible and retractable pusher arm 34 can be coupled to post 18. In the present example, pusher arm 34 comprises an outer sleeve 36 and a telescoping inner member 40. However, extensibility may be provided in other ways as well.

The rectangular sections of the clamp have aligned holes (not shown) accommodating a horizontal pivot pin 35 which also extends through aligned holes in the end of sleeve 36. In this way, the sleeve 36 is pivotally mounted at one end to clamp 30 and hence to post 18.

Sleeve 36 is an elongated hollow member of rectangular cross-section having a longitudinal slot 37 facing upwardly. Fixed to the free end of sleeve 36, such as by welding, are a pair of plates 38 between which a rope support means in the form of a pulley 39 is rotatably mounted.

Sleeve 36 slidably supports the member 40, which may be a solid member having a rectangular cross-section. Near its end closest to post 18, member 40 has an upwardly projecting loop 41 slidably extending through slot 37 in sleeve 36. The end of member 40 remote from post 18 is bifurcated and carries a roller 42 adapted to engage the bow of the boat 11 to be pushed off the trailer.

Figure 4:
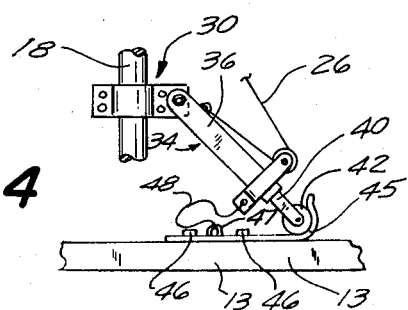
FIG. 4 shows a partial side elevational view of the attachment, the pusher arm being held in place by a clip connected to the frame of the trailer.

Referring to FIGS. 2 and 4, frame 13 supports a springy clip 45 connected to it by screws 46. Clip 45 includes a curved section which, when the member 40 is inserted as far as it will go into the sleeve 36, is engageable with the roller 42 to secure the pusher arm 34 when it is not in use, as shown in FIG. 4. Further, clip 45 includes a loop 47 which is coupled by a short line 48 to the plates 38. As shown in FIG. 2, rope 48 serves to limit the angle through which the arm 34 is pivoted upwardly.

As is shown in FIGS. 1–4, rope 26 can be passed over the pulley 39 and hook 28 can be engaged with loop 41. If the parts of the arrangement are so engaged and the clip 45 and roller 42 are disengaged, the sleeve 36 and member 40 can be raised manually into a position parallel with the frame 13 and the slack thereby generated in rope 26 can be taken in by a simultaneous or subsequent rotation of the winch. Thereafter, the winch 22 can be used to take in more of rope 26, thereby applying a force to member 40 in a direction away from post 18 and thus extending the member 40 in the direction of arrow 50 (see FIG. 3). Once arm 34 reaches its uppermost position, i.e., when line 48 becomes taut, the only effect of operating the winch 22 to take in rope will be to extend member 40 out of sleeve 36. If, as shown in FIG. 2, a boat 11 is on the trailer 10, when the rope 26 is taken in to extend member 40, the roller 42 is moved into abutment with the bow of the boat and pushes the boat rearwardly with respect to the trailer. As member 40 is extened, the angle between the rope 26 and the member 40 increases. When the angle reaches 90 degrees only a perpendicular face is applied by the rope 26 to the member 40 and, therefore, no further extension of the member 40 takes place. It should be noted that as the boat is being launched, frictional forces against its bow are significantly reduced by the use of roller 42 to push the boat 11.

From the foregoing, it may be seen that the arrangement takes advantage of the leverage provided by a winch to initiate the movement of a boat off the trailer. The most difficult part of moving a boat off a trailer is pushing the boat the first few feet. The present invention greatly relieves this task. After this initial movement, it is relatively easy to finish the job by manually pushing the boat comletely off the trailer.

It is to be understood that the description herein of a preferred embodiment according to the invention is set forth as an example thereof and is not to be construed or interpreted as a limitation on the claims which follow and define the invention.

What is claimed is:

1. An attachment for use with a boat trailer having an upstanding post, a winch mounted on said post, and a rope wound on the winch, said attachment comprising:

a. an elongated pusher arm longitudinally extensible and retractable, said pusher arm having two ends movable toward and away from each other in the longitudinal direction of said pusher arm,
   b. means for coupling an end of said arm to the post, the other end of said arm being adapted for engagement with the bow of a boat mounted on the trailer,
   c. means for securing an end of the rope to said arm, and
   d. rope support means spaced from said post for reversing the direction of the rope between its said end and said winch,
   whereby winding the rope on to the winch causes said rope end to apply a force to said arm in a direction away from the post so that said arm is extended and its said other end can push a boat rearwardly with respect to the trailer.

2. An attachment as defined in claim 1 wherein said pusher arm comprises two elongated parts movable longitudinally with respect to each other.

3. An attachment as defined in claim 1 wherein said pusher arm parts include an outer sleeve and a telescoping inner member, and said means (c) includes an attachment means carried by said member.

4. An attachment as defined in claim 3 wherein said sleeve has a longitudinal slot, and said attachment means includes a loop extending slidably through said slot.

5. An attachment as defined in claim 3 wherein said rope support means is carried by said sleeve near its end remote from said coupling means.

6. An attachment as defined in claim 1 including means pivotally connecting said pusher arm to said coupling means for permitting pivoted movement of said arm in a vertical plane.

7. An attachment as defined in claim 6 including means for limiting the upward pivotal movement of said arm.

8. An attachment as defined in claim 1 including means for retaining said pusher arm in a lowered and retracted condition when it is not in use.

9. An attachment as defined in claim 1 including a roller at the free end of said arm for reducing the friction between the arm and the bow of a boat engaged by the arm.

* * * * *